(12) United States Patent
Sakamoto

(10) Patent No.: US 8,974,004 B2
(45) Date of Patent: Mar. 10, 2015

(54) VEHICLE SEAT

(71) Applicant: Toyota Boshoku Kabushiki Kaisha, Aichi-ken (JP)

(72) Inventor: Noritaka Sakamoto, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 18 days.

(21) Appl. No.: 13/903,136

(22) Filed: May 28, 2013

(65) Prior Publication Data

US 2013/0320743 A1    Dec. 5, 2013

(30) Foreign Application Priority Data

May 30, 2012  (JP) ................ 2012-123476

(51) Int. Cl.
| | | |
|---|---|---|
| *A47C 7/24* | (2006.01) | |
| *A47C 7/26* | (2006.01) | |
| *A47C 31/02* | (2006.01) | |
| *B60N 2/64* | (2006.01) | |
| *B60R 21/207* | (2006.01) | |
| *B60N 2/58* | (2006.01) | |

(52) U.S. Cl.
CPC ............ *B60N 2/64* (2013.01); *B60R 21/207* (2013.01); *B60N 2002/5808* (2013.01)
USPC .............. 297/452.6; 297/218.1; 297/218.2; 297/218.3; 297/218.5

(58) Field of Classification Search
USPC ............ 297/218.1–218.5, 452.12–452.62
See application file for complete search history.

(56) References Cited

U.S. PATENT DOCUMENTS

| | | | | |
|---|---|---|---|---|
| 3,632,164 | A | * | 1/1972 | Radke .................. 297/452.6 |
| 3,649,974 | A | * | 3/1972 | Baruth et al. ......... 297/452.59 X |
| 3,669,498 | A | * | 6/1972 | Meyers et al. ............ 297/452.53 |
| 3,727,980 | A | * | 4/1973 | Tischler .................... 297/452.53 |
| 4,317,591 | A | * | 3/1982 | Ramsey .................... 297/452.6 |
| 4,337,931 | A | * | 7/1982 | Mundell et al. ........ 297/452.53 X |
| 4,452,488 | A | * | 6/1984 | Rugienius .................. 297/452.6 |
| 4,558,905 | A | * | 12/1985 | Natori ........................ 297/452.6 |
| 4,579,389 | A | * | 4/1986 | Shimbori et al. ........... 297/452.6 |
| 5,283,918 | A | * | 2/1994 | Weingartner et al. ..................... 297/452.53 X |
| 5,338,098 | A | * | 8/1994 | Ohnishi ..................... 297/452.6 |
| 5,632,053 | A | * | 5/1997 | Weingartner et al. ..................... 297/452.62 X |
| 5,641,204 | A | * | 6/1997 | Lhuissier et al. .... 297/452.48 X |
| 6,003,939 | A | | 12/1999 | Nakai et al. |
| 6,082,824 | A | * | 7/2000 | Chow ............... 297/452.22 X |
| 7,017,997 | B2 | * | 3/2006 | Takezawa et al. ......... 297/452.6 |
| 7,703,855 | B1 | * | 4/2010 | Kalinowski ................ 297/452.6 |
| 8,099,837 | B2 | * | 1/2012 | Santin et al. ........... 297/452.6 X |
| 8,371,655 | B2 | * | 2/2013 | Nonomiya ............... 297/452.18 |
| 8,465,092 | B2 | * | 6/2013 | Kanda et al. .......... 297/452.18 X |
| 2012/0326483 | A1 | * | 12/2012 | Baumgarten ......... 297/452.18 X |

FOREIGN PATENT DOCUMENTS

| | | |
|---|---|---|
| JP | 3-53146 | 5/1991 |
| JP | 3335849 | 8/2002 |

\* cited by examiner

*Primary Examiner* — Rodney B White

(74) *Attorney, Agent, or Firm* — Greenblum & Bernstein, P.L.C.

(57) ABSTRACT

A vehicle seat including: a seat component such as a seat cushion and a seat back, the seat component including, a cushioning material constituting an outer shape of the vehicle seat, a through-hole penetrating the cushioning material in a thickness direction thereof, and a skin material configured to cover the cushioning material, wherein a reinforcing wire is embedded into the cushioning material at both sides of the through-hole, respectively.

7 Claims, 5 Drawing Sheets

VEHICLE SEAT

CROSS-REFERENCE TO RELATED APPLICATIONS

This application claims priority from Japanese Patent Application No. 2012-123476 filed on May 30, 2012, the entire contents of which are incorporated herein by reference.

TECHNICAL FIELD

Aspects of the present invention relate to a vehicle seat which includes a cushioning material constituting an outer shape of the vehicle seat, a through-hole of the cushioning material, and a reinforcing wire (a rod-shaped member embedded in the cushioning member).

BACKGROUND

As this kind of vehicle seat, a vehicle seat including a seat cushion and a seat back (seat component) are known (see Japanese Patent Publication No. 3335849). The seat component includes a frame member constituting a seat frame, a cushioning material constituting an outer shape of the seat, a through-hole of the cushioning material and a skin material having a bag shape and covering the cushioning material.

Here, the seat back includes an airbag and configurations relevant thereto (for example, a cleavage portion and a webbing). The cleavage portion is a weakened region of the skin material which is formed on a side portion (seated side) of the seat back and the airbag can bulge through the cleavage portion. The webbing is a cloth material (a relatively large cloth material) of a size according to the airbag. The through-hole is a hole portion that penetrates the cushioning material in a thickness direction and is formed near the side portion of the seat back.

In related art, the webbing is sewn to the back side of the skin material to reinforce the portion of the skin material other than the cleavage portion. At this time, the webbing passes through the through-hole of the cushioning material and is fixed to the frame member, while being located on the back side of the skin material. And, by the impact at the time of a vehicle collision, the airbag is bulged through the cleavage portion to protect an occupant. At this time, a bulging direction of the airbag is regulated (by reinforcing the portion of the skin material other than the cleavage portion with the webbing) and thus stress is concentrated on the cleavage portion, so that the airbag can be reliably bulged through the cleavage portion.

Further, in the seat component described above, a portion of the skin material can be attached to the cushioning material in a retracted form. The seat component includes a suspending wire, a fixing wire (an example of a reinforcing wire) and a ring member (a substantially C-shaped member).

The suspending wire is a rod-shaped member extending in a linear form and the fixing wire is a rod-shaped member which can be opposed to the suspending wire. The fixing wire is bent in a substantially transverse U shape at a midstream. Further, the ring member is a substantially C-shaped member and can be closed in a substantially O-shape by a tool, etc.

In the related art, the fixing wire is embedded in the cushioning material and partially exposed through groove portions of the cushioning material. The fixing wire extends in a vertical direction of the seat. At this time, interference of the fixing wire with the through-hole can be prevented owing to the bent portion of the fixing wire.

Then, the suspending wire is attached to a portion of the skin material and arranged so as to be opposed to the fixing wire. The suspending wire and the fixing wire are connected to each other by the ring member while a portion of the skin material is retracted into the groove portion of the cushioning material. Accordingly, the portion of the skin material can be fixed to the cushioning material in a retracted form.

However, in the related art, the strength of the cushioning material is partially decreased due to the through-hole of the cushioning material, and therefore, there is a risk that the sitting property of the seat is degraded.

Indeed, it is possible to slightly reinforce the cushioning material by arranging the fixing wire in close proximity to the through-hole. However, since the fixing wire has a bent shape, rigidity thereof is not enough.

SUMMARY

The present invention has been made in view of the above circumstances and an object of the present invention is to optimally reinforce a cushioning material having a through-hole.

According to an aspect of the present invention, there is provided a vehicle seat including: a seat component such as a seat cushion and a seat back, the seat component including, a cushioning material constituting an outer shape of the vehicle seat, a through-hole penetrating the cushioning material in a thickness direction thereof, and a skin material configured to cover the cushioning material, wherein a reinforcing wire is embedded into the cushioning material at both sides of the through-hole, respectively.

According to another aspect of the present invention, there is provided a vehicle seat including: a seat component including, a cushioning material constituting an outer shape of the vehicle seat, a through-hole penetrating the cushioning material in a thickness direction thereof, and a skin material configured to cover the cushioning material, wherein a first reinforcing wire is embedded into the cushioning material at a first side of the through-hole, and a second reinforcing wire is embedded into the cushioning material at a second side of the through hole opposite to the first side.

Accordingly, it is possible to suitably reinforce the cushioning material having the through-hole.

DETAILED DESCRIPTION

Hereinafter, an exemplary embodiment of the present invention will be described with reference to FIG. 1 to FIG. 5. In the respective figures, a front side of a vehicle seat is denoted by a reference letter F, a rear side of the vehicle seat is denoted by a reference letter B, an upper side of the vehicle seat is denoted by a reference letter UP and a lower side of the vehicle seat is denoted by a reference letter DW, as appropriate.

Figure 1:
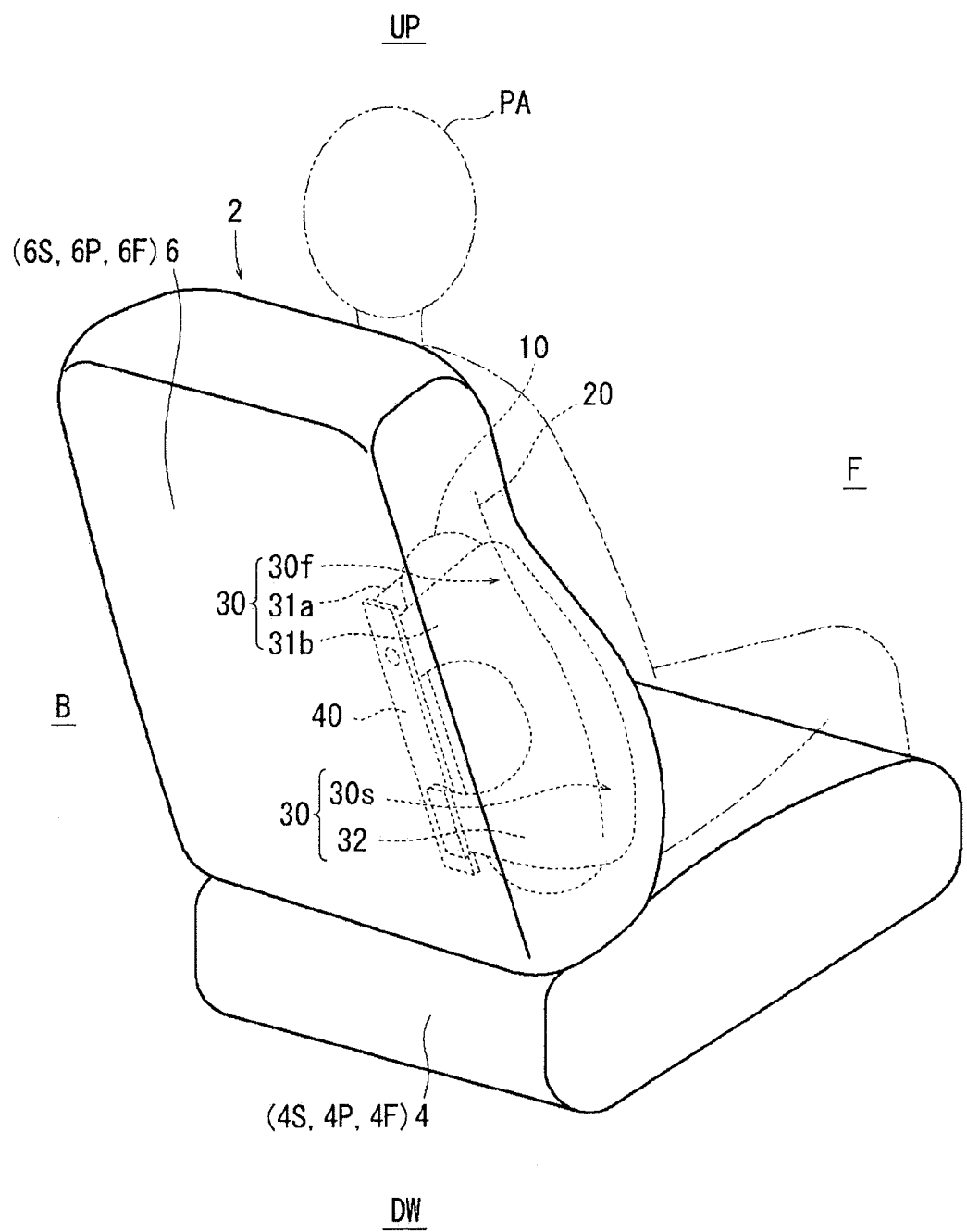
FIG. 1 is a perspective view of a vehicle seat.

A vehicle seat 2 in FIG. 1 includes a seat cushion 4 and a seat back 6. These components of the vehicle seat respectively include a frame member (4F, 6F) constituting a seat frame, a cushioning material (4P, 6P) constituting an outer appearance of the vehicle seat and a skin material (4S, 6S) covering the cushioning material.

First Exemplary Embodiment

The seat back 6 includes the basic configurations (6F, 6S, 6P), a main portion 6a, side portions 6b, an airbag 10 and relevant configurations thereof (a cleavage portion 20, a webbing 30, a bracket 40), and a plurality of attaching portions 24 to 26 (see FIG. 1 and FIG. 2; details of each part will be described later, as appropriate).

Here, the main portion 6a is a central flat region of the seat back 6 and can be opposed to a trunk portion (back portion or waist portion, etc.) of an occupant. Further, the side portions 6b are regions which are located on the sides of the main portion 6a and protrude toward a seating side of the seat back 6.

In the present exemplary embodiment, the cushioning material 6P is arranged on the frame member 6F (arcuate frame body). The cushioning material 6P is covered with the skin material 6S and a portion (an inside-out portion 16) of the skin material is provided in a suspending form and attached to the skin material 6P at each of the attaching portions 24 to 26 (see FIG. 1 to FIG. 3).

Figure 4:
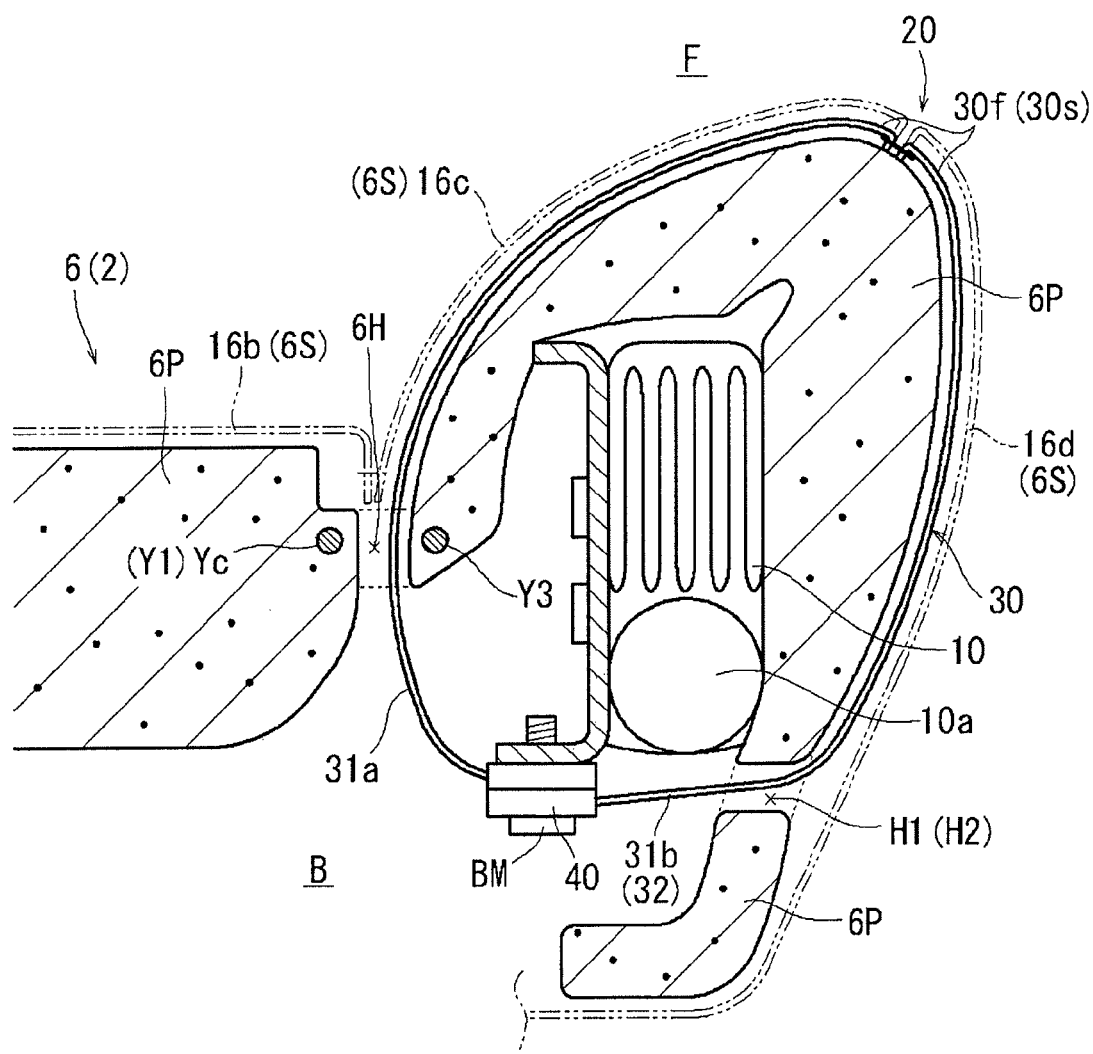
FIG. 4 is a transverse sectional view showing a part of the seat back.

Further, by the impact at the time of a vehicle collision, the airbag 10 is bulged through the cleavage portion 20 to protect the occupant (see FIG. 4). At this time, a bulging direction of the airbag 10 is regulated (by reinforcing the portion of the skin material other than the cleavage portion 20 by the webbing 30) so that the airbag 10 is securely bulged through the cleavage portion 20.

Although the cushioning material 6P is formed with a through-hole 6H in which the webbing 30 is provided in the present exemplary embodiment, it is desirable in this configuration that the cushioning material 6P (the place where the through-hole 6H is formed) can be suitably reinforced.

Accordingly, in the present exemplary embodiment, the cushioning material 6P having the through-hole 6H is more suitably reinforced by the configuration described below. Hereinafter, each component will be described in detail.

[Skin Material]

Figure 3:
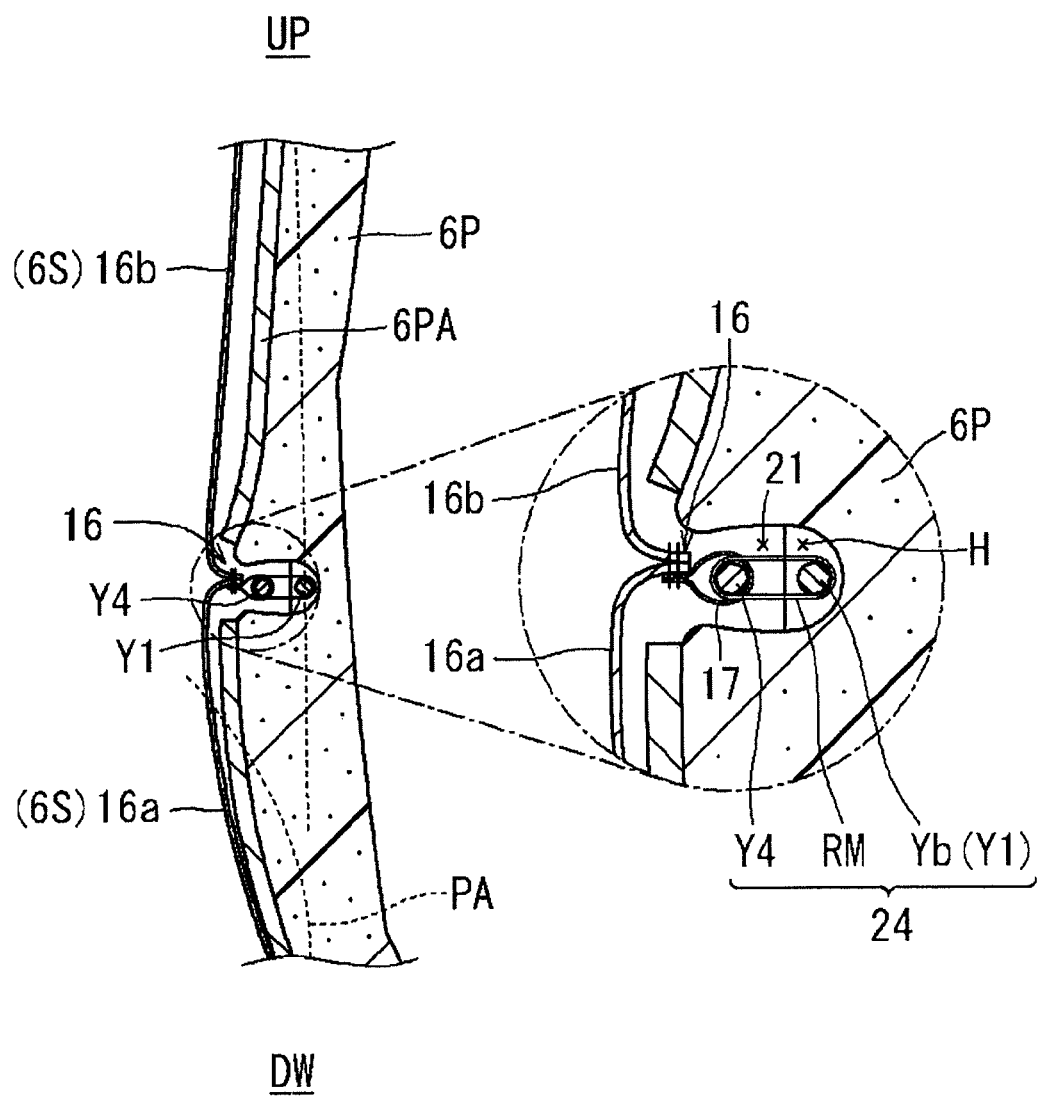
FIG. 3 is a longitudinal sectional view showing a part of a seat back.

The skin material 6S is configured by stitching a plurality of skin pieces (a first piece 16a, a second piece 16b, a third piece 16c, a fourth piece 16d) into a bag shape (see FIG. 1, FIG. 3 and FIG. 4).

The first piece 16a and the second piece 16b are members that cover the center (the main portion 6a) of the cushioning material 6P. Further, the third piece 16c and the fourth piece 16d are members that cover the sides (the side portions 6b) of the cushioning material 6P, respectively.

In the present exemplary embodiment, ends of the pieces adjacent to each other are respectively folded-back inwardly in an overlapping manner to form the inside-out portion 16 (see FIG. 3). The inside-out portion 16 (a portion of the skin material) protrudes inwardly of the vehicle seat and extends linearly in a width direction (or a front and rear direction) of the vehicle seat. The inside-out portion 16 is provided in a suspending form and attached to the cushioning material 6P at each of the attaching portions 24 to 26 described below.

[Cushioning Material (Through Hole)]

Figure 2A:
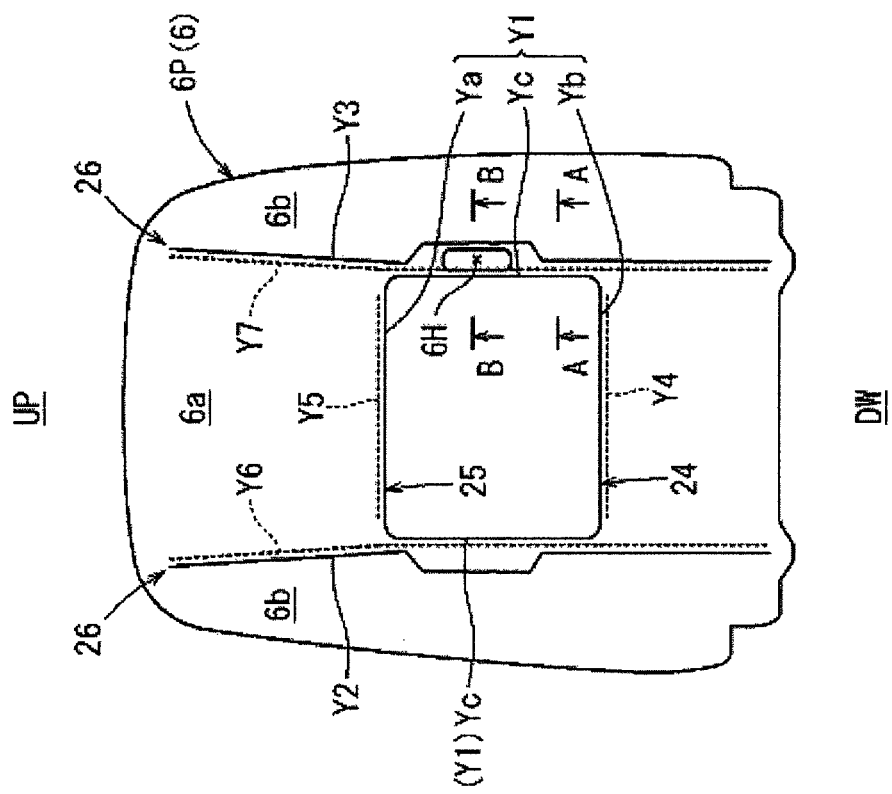
FIG. 2A is a front view of a cushioning material and FIG. 2B is a schematic view of the cushioning material, showing the arrangement positions of a wire material.
Figure 2B:
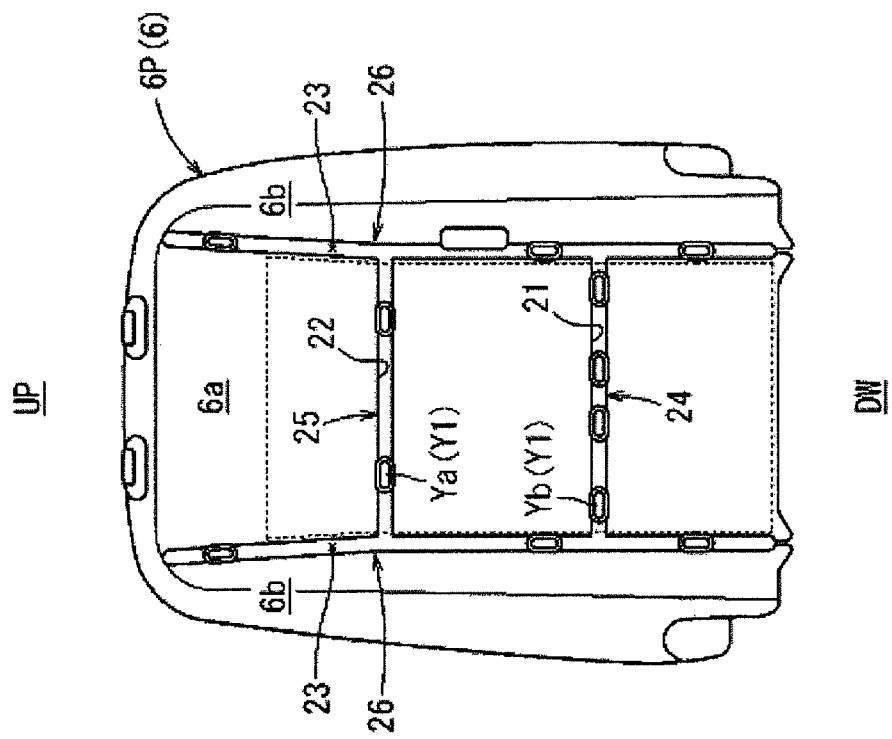

The cushioning material 6P is a member that elastically supports an occupant and provided with a plurality of groove portions 21 to 23 and the through-hole 6H (see FIG. 1 to FIG. 3).

Here, although the material of the cushioning material 6P is not particularly limited, it is desirable that elastically stretchable resin is used. As an example of such a resin, polyurethane foam (density: 10 kg/m$^3$ 60 kg/m$^3$) can be used. Meanwhile, it is possible to improve the sitting property of the seat by placing a planar pad material 6PA on a seating surface side of the cushioning material 6P.

Further, the through-hole 6H is a hole portion that penetrates the cushioning material 6P in a thickness direction and is a part associated with the installation of the airbag 10 described later (see FIG. 4). In the present exemplary embodiment, the through-hole 6H is formed in the middle (at an adjacent position of the main portion 6a) of the side portions 6b and placed close to the lateral groove portion 23 described later.

A plurality of groove portions (central groove portions 21, 22 and the lateral groove portion 23) is a linear recessed region and formed on a seating side of the cushioning material 6P (see FIG. 2 and FIG. 3).

The central groove portions 21, 22 are recessed regions extending in a width direction of the seat and the lateral groove portion 23 is a recessed region extending in a vertical direction of the seat (with respect to the seat back 6 in an upright state). The central groove portions 21, 22 and the lateral groove portion 23 include a plurality of hole portions H (portions deeper by one step) which allow each wire material (described later) to be partially exposed (see FIG. 3).

In the present exemplary embodiment, a pair of lateral groove portions 23 is respectively formed between the main portion 6a and the side portions 6b. Then, a pair of central groove portions (a first central groove portion 21 and a second central groove portion 22) is respectively formed in parallel across the main portion 6a and both ends of the central groove portions respectively communicates with the lateral groove portions 23. The second central groove portion 22 is placed at an upper portion of the main portion 6a and the first central groove portion 21 is placed at a lower portion (at a position lower than the second central groove portion 22) of the main portion 6a.

[Attaching Portion]

A plurality of attaching portions (a pair of central attaching portions 24, 25 and a pair of lateral attaching portions 26) is a region by which a portion (the inside-out portion 16) of the skin material can be attached to the cushioning material 6P in a suspending form (see FIG. 2 and FIG. 3).

Each of the attaching portions 24 to 26 in the present exemplary embodiment can be formed along respective corresponding groove portions (the central groove portions 21, 22 and the lateral groove portions 23). The first central attaching portion 24 is formed along the first central groove portion 21 and extends in the width direction of the seat. Further, the second central attaching portion 25 is formed along the second central groove portion 22 and arranged above the first central attaching portion 24. Here, the first central attaching portion 24 and the second central attaching portion 25 are arranged parallel to each other. A pair of lateral attaching portions 26 is respectively formed along the lateral groove portions 23 and extends in the vertical direction of the seat (with respect to the seat back 6 in an upright state).

(Fixing Wire, Suspending Wire and One of the Reinforcing Wires)

Each of the attaching portions 24 to 26 in the present exemplary embodiment includes wire materials Y1 to Y3 (fixing wires) on the side of the cushioning material, wire materials Y4 to Y7 (suspending wire) on the side of the skin material and a ring member RM (see FIG. 2 and FIG. 3). The ring member RM is a substantially C-shaped member and can be closed in a substantially O-shape by a tool, etc.

Here, the first wire material Y1 is a rod-shaped member having a substantially rectangular shape (a shape covering both central groove portions 21, 22) and includes an upper wire Ya, a lower wire Yb and a pair of connecting wires Yc (one of the reinforcing wires) that connects the ends of the upper wire Ya and the lower wire Tb (see FIG. 3).

In the present exemplary embodiment, the first wire material Y1 is arranged to cover both central groove portions 21, 22. In this way, the upper wire Ya is disposed within the first central groove portion 21 and the lower wire Yb is disposed within the second central groove portion 22. Further, the connecting wires Yc (one of the reinforcing wires) are arranged in the end of the main portion 6a while being embedded in the cushioning material 6P. In this way, the connecting wires Yc are arranged in proximity to the through-hole 6H (see FIG. 4).

(First Central Attaching Portion)

The first central attaching portion 24 includes a plurality of wire materials (the lower wire Yb and the fourth wire material Y4) and the ring member RM (see FIG. 2 and FIG. 3).

The lower wire Yb (in a straight form) has a length dimension which can be located along the first central groove portion 21. Further, the fourth wire material Y4 is a rod-shaped member having the same shape and dimensions as the lower wire Yb.

In the present exemplary embodiment, the lower wire Yb is embedded into the first central groove portion 21 and the fourth wire material Y4 is attached to a portion (the inside-out portion 16) of the skin material. At this time, a substantially rectangular cloth material 17 is folded inwardly and attached to the end (the inside-out portion 16) of the first piece 16a and the second piece 16b. Then, the fourth wire material Y4 is inserted into the cloth material 17 and is arranged to extend in a width direction of the seat (is arranged so as to be opposed to the lower wire Yb).

(Second Central Attaching Portion)

The second central attaching portion 25 includes a plurality of wire materials (the upper wire Ya and the fifth wire material Y5) and a ring member (not shown) (see FIG. 2).

The upper wire Ya (in a straight form) has a length dimension which can be located along the second central groove portion 22. Further, the fifth wire material Y5 is a rod-shaped member having the same shape and dimensions as the upper wire Ya.

In the present exemplary embodiment, the upper wire Ya is embedded into the second central groove portion 22 and the fifth wire material Y5 is attached to a portion (the inside-out portion 16) of the skin material. At this time, the fifth wire material Y5 is attached to an end (the inside-out portion) of the second piece 16b and the third piece 16c and arranged so as to be opposed to the upper wire Ya.

(Lateral Attaching Portion and the Other of the Reinforcing Wires)

Each lateral attaching portion 26 includes the second wire material Y2 (the third wire material Y3), the sixth wire material Y6 (the seventh wire material Y7) and a ring member (not shown) (see FIG. 2).

The second wire material Y2 (the third wire material Y3) is a substantially linear member and has a length dimension which can be located along the lateral groove portion 23. Further, the sixth wire material Y6 (the seventh wire material Y7) is a linear rod-shaped member and has substantially the same length dimension as the second wire material Y2 (the third wire material Y3).

In the present exemplary embodiment, the second wire material Y2 (the third wire material Y3) is embedded into the lateral groove portion 23 and the sixth wire material Y6 (the seventh wire material Y7) is attached to a portion (the inside-out portion) of the skin material. At this time, the sixth wire material Y6 is attached to the ends of the central skin pieces 16a to 16c and the fourth piece 16d and arranged so as to be opposed to the second wire material Y2. Similarly, the seventh wire material Y7 is attached to the ends of each skin piece and arranged so as to be opposed to the third wire material Y3.

In the present exemplary embodiment, the third wire material Y3 (the other of the reinforcing wires) can avoid the through-hole 6H of the cushioning material 6P owing to the bent portions on the way. Further, as described above, since the third wire material Y3 (the other of the reinforcing wires) is embedded in the cushioning material 6P, the third wire material is located on the end of the side portion 6b and arranged in proximity to the through-hole 6H (see FIG. 4).

[Airbag]

The airbag 10 is a substantially cube-shaped member in an unexpanded state and can be expanded by the impact at the time of a vehicle collision to protect an occupant (see FIG. 1 and FIG. 4).

Here, the airbag 10 may be communicated with an air supply device (an inflator 10a shown in FIG. 4) or may be configured to enclose a gas generating agent.

In the present exemplary embodiment, the airbag 10 in an unexpanded state is arranged at the side (interior of the side portion, etc.) of the seat back 6 (see FIG. 4).

(Cleavage Portion)

The cleavage portion 20 is a weakened region of the skin material 6S which is provided on the side of the seat and can be cleaved (opened) by expansion of the airbag 10 (see FIG. 1 and FIG. 4).

In the present exemplary embodiment, the cleavage portion 20 is formed in a groove shape and extends in a vertical direction (in an upright state of the seat). At this time, a weakened sewn portion (the cleavage portion 20) can be formed by stitching the third piece 16c and the fourth piece 16d together into an inwardly-folded shape (inside-out shape). The cleavage portion 20 can be formed at the center of the side portion 6b in accordance with the bulging direction of the airbag 10 (see FIG. 4).

(Webbing)

The webbing 30 is a cloth material (woven fabric, knitted fabric, non-woven fabric, etc.) of a size according to the airbag 10 and partitioned into two regions (a first region 30f and a second region 30s) (see FIG. 1 and FIG. 4).

In the present exemplary embodiment, the webbing 30 is placed on the back side of the skin material 6S (that is, a portion of the skin material other than the cleavage portion is reinforced with the webbing 30) and therefore stress is concentrated to the cleavage portion 20.

The first region 30f is a region that covers a portion of the airbag 10 which expands toward the upper portion of an occupant. The first region 30f includes a pair fixing portions 31a, 31b (both have a shape of a narrow strip). Further, the second region 30s is a region to cover a portion of the airbag 10 which expands toward the lower portion of an occupant. The second region 30s includes a fixing portion 32 (in a shape of a narrow strip).

In the present exemplary embodiment, one side (the first region 30f and the second region 30s) of the webbing 30 is stitched to the sewn portions (both ends of the cleavage portion 20) of the skin pieces so as not to interfere with cleaving of the cleavage portion 20 described above (see FIG. 1 and FIG. 4). The first region 30f is solely arranged on the side surface (upper side) of the seat back 6 and the side portion 6b and the second region 30s is arranged on the side surface (lower side) of the seat back 6.

(Bracket)

The bracket 40 is a relatively long plate-shaped member and has a length dimension corresponding to the airbag 10 (see FIG. 1 and FIG. 4).

In the present exemplary embodiment, the other side (the fixing portions 31a, 31b, 32) of the webbing 30 is fixed to the frame member 6F through the bracket 40.

At this time, an upper portion of the airbag 10 is covered with the first region 30f and one fixing portion 31a is fixed to the bracket 40 through the through-hole 6H of the cushioning material 6P. Further, the other fixing portion 31b is fixed to the bracket 40 through a through-hole H1 of at the lateral upper side of the cushioning material 6P. Similarly, a lower portion of the airbag 10 is covered with the second region 30s and the fixing portion 32 is fixed to the bracket 40 through a through-hole H2 at the lateral lower side of the cushioning material 6P.

Next, by fixing the bracket 40 to the frame member 6F by insertion of a bolt member BM, the webbing 30 can be provided within the seat.

[Covering Operation of Skin Material]

By referring to FIG. 1, FIG. 3 and FIG. 4, the cushioning material 6P is covered with the skin material 6S and the inside-out portion 16 is respectively attached to a plurality of groove portions 21 to 23 in a suspending form (each attaching portion 24 to 26 is formed).

At this time, in the present exemplary embodiment, a wire material (for example, Yb) on the side of the cushioning material 6P and a wire material (for example, Y4) on the side of the skin material 6S are respectively connected by the ring member RM at each attaching portion 24 to 26 (see FIG. 3). In this way, a portion (the inside-out portion 16) of the skin material is provided in a suspending form and can be attached to the cushioning material 6P at a plurality of groove portions 21 to 23.

In the above configuration, the strength of the cushioning material 6P is partially decreased due to the through-hole 6H of the cushioning material 6P and therefore there is a risk that the sitting property of the seat is degraded (see FIG. 2 and FIG. 4).

Accordingly, in the present exemplary embodiment, the reinforcing wires (Yc, Y3) are respectively embedded into both sides of the through-hole 6H. Specifically, in the present exemplary embodiment, by arranging the first wire material Y1 in each attaching portion 24, 25, the connecting wire Yc (one of the reinforcing wires) is located in the end of the main portion 6a and arranged in proximity to the through-hole 6H. Further, by embedding the third wire material Y3 (the other of the reinforcing wires) into the cushioning material 6P, the third wire material Y3 is located in the end of the side portion 6b and arranged in proximity to the through-hole 6H.

By respectively embedding the reinforcing wires (Yc, Y3) into both sides of the through-hole 6H in this way, it is possible to more suitably reinforce the cushioning material 6P (the position where the through-hole 6H is formed). Further, in the present exemplary embodiment, since the connecting wire Yc (one of the reinforcing wires) and the third wire material Y3 (the other of the reinforcing wires) are opposed to each other with the through-hole 6H therebetween, it is possible to further suitably reinforce the cushioning material 6P.

As described above, in the present exemplary embodiment, the strength of the cushioning material 6P can be suitably maintained by reinforcing the position where the through-hole 6H is formed with a plurality of reinforcing wires (Yc, Y3).

Further, in the present exemplary embodiment, since the above reinforcing structure is configured by at least a portion of the fixing wires (Y1, Y3), the vehicle seat has a relatively simple configuration.

Therefore, according to the present exemplary embodiment, it is possible to suitably reinforce the cushioning material 6P having the through-hole 6H.

Modified Examples

In addition to the above-described configurations, each wire material can take various configurations (see FIG. 5).

Although the first wire material Y1 is formed by a single member in the first exemplary embodiment, the first wire material Y1 may be formed by a plurality of wire materials. For example, by referring to FIG. 5A, a first wire material Y1a of a first modification may be configured in such a way that the upper wire Ya, the lower wires (a pair of wires YB) and the connecting wire Yc (one of the reinforcing wires) are respectively formed as a separate member (the first wire material may be formed by three wire materials). Further, a first wire material Y1b of a second modification may be configured in such a way that the upper wire Ya and the connecting wire Yc are integrally formed and the lower wires (a pair of wires YB) are formed as a separate member (see FIG. 5B).

Figure 5A:
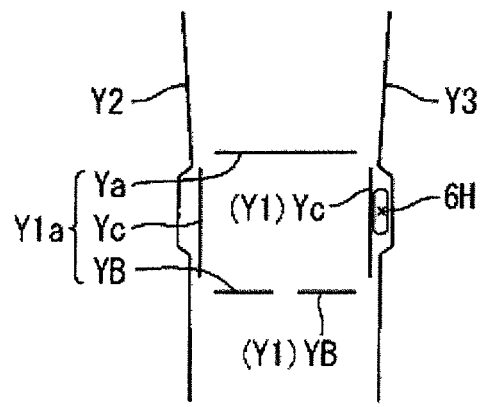
FIG. 5A to FIG. 5D are views showing a modified example of the wire material, respectively.
Figure 5B:
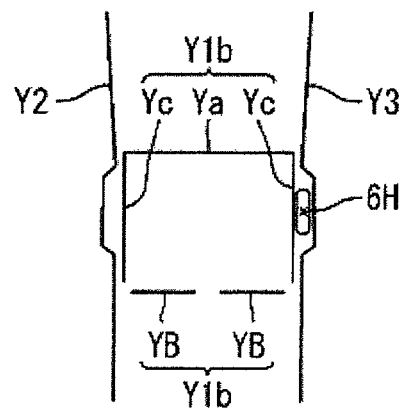
Figure 5C:
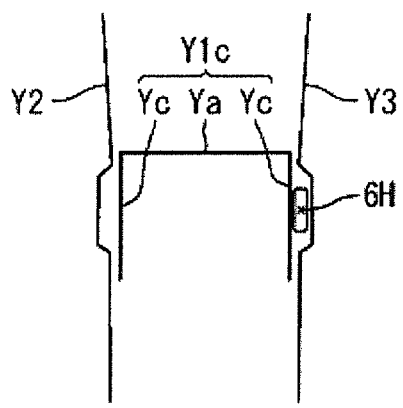

Further, in a third modification, a first wire material Y1c may be formed by the upper wire Ya and the connecting wire Yc (the lower wires may be omitted) (see FIG. 5C).

Figure 5D:
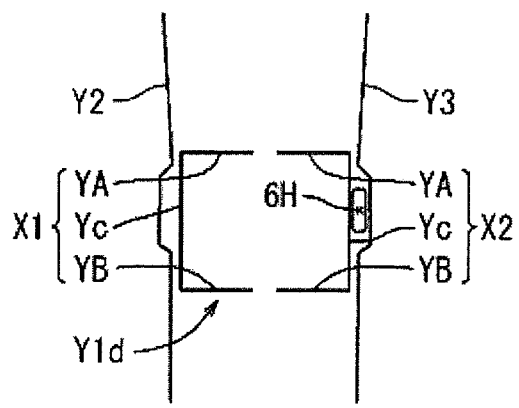

In a fourth modification, a first wire material Y1d may be configured by a pair of wire materials X1, X2 (individual wire material) (see FIG. 5D). Each wire material X1, X2 is a substantially transverse U-shaped wire material and includes a portion (YA) of the upper wire Ya, a portion (YB) of the lower wire and the connecting wire Yc. And, the first wire material Y1d may be configured by arranging a pair of wire materials X1, X2 to be opposed to each other.

The vehicle seat of the present invention is not limited to the above-described exemplary embodiments but may take various embodiments. (1) Although a configuration of the reinforcing wire is illustrated in the present embodiment, it is not intended to limit the configuration of the wire. For example, the reinforcing wire may be formed separately from the fixing wire. Further, the reinforcing wire material may be embedded into the cushioning material or a portion of the reinforcing wire material may be embedded and a portion thereof may be exposed. A pair of reinforcing wires may be arranged parallel to the through-hole in any one direction of a front and rear direction of the seat, a width direction of the seat and a vertical direction of the seat. Further, although a pair of reinforcing wires is opposed to each other with the through-hole therebetween in the present embodiment, the reinforcing wires may be arranged slightly offset in a thickness direction of the cushioning material. Although the material of each wire material is not particularly limited, hard material (material harder than the cushioning material) such as metal or rigid resin can be desirably used. (2) Further, although a configuration (shape, dimension, number of formation, etc.) of the through-hole 6H is illustrated in the present embodiment, it is not intended to limit the configuration of the through-hole. Each through-hole can be formed in single or plural in suitable positions depending on the configuration of the seat. Further, the through-hole can be used to install various members such as a sensor member, in addition to an airbag.

(3) Further, although a configuration (shape, dimension, number of formation, etc.) of each groove portion and each attaching portion is illustrated in the present embodiment, it is not intended to limit the configuration of these portions. For example, the groove portion and the attaching portion may be formed in single or plural. (4) Further, although the fixing wire and the suspending wire are indirectly connected to each other via the cloth material 17 in the present embodiment, the fixing wire and the suspending wire may be directly connected to each other without the cloth material. (5) Further, although a configuration example of the attaching portion using the fixing wire and the suspending wire is illustrated in the present embodiment, it is not intended to limit the configuration of the attaching portion. For example, as a configuration example of the attaching portion, a configuration (suspender structure) may be illustrated in which a cutout portion is provided in the peripheral edge of the inside-out portion and a resin member (linear form) is fixed to an end of the inside-out portion. The ring member is connected to the fixing wire while being inserted into the cutout portion. (6) Further, although the seat back 6 was illustrated in the present embodiment, the configuration of the present embodiment may be applied to various components such as the seat cushion 4, a headrest, etc.

The present invention provides illustrative, non-limiting aspects as follows:

(1) In a first aspect, there is provided a vehicle seat including: a seat component such as a seat cushion and a seat back, the seat component including, a cushioning material constituting an outer shape of the vehicle seat, a through-hole penetrating the cushioning material in a thickness direction thereof, and a skin material configured to cover the cushioning material, wherein a reinforcing wire is embedded into the cushioning material at both sides of the through-hole, respectively.

In a vehicle seat, it is desirable that a cushioning material having a through-hole can be suitably reinforced. In this regard, according to the vehicle seat of the first aspect, since the reinforcing wire is embedded into the cushion material at both sides of the through-hole, respectively, it is possible to more suitably reinforce the cushioning material (a position where the through-hole is formed).

(2) in a second aspect, there is provided the vehicle seat according to the first aspect, wherein the seat component includes a fixing wire which is provided in a groove portion of the cushioning material and a suspending wire which is provided to the skin material and configured to be arranged so as to be opposed to the fixing wire, wherein a portion of the skin material is configured to be attached to the cushioning material in a suspending form by connecting the fixing wire and the suspending wire, and wherein the reinforcing wire is configured by at least a portion of the fixing wire.

According to the second aspect, since the reinforcing wire is configured by at least a portion of the fixing wire, the vehicle seat can have a relatively simple configuration.

(3) In a third aspect, there is provided a vehicle seat including: a seat component including, a cushioning material constituting an outer shape of the vehicle seat, a through-hole penetrating the cushioning material in a thickness direction thereof, and a skin material configured to cover the cushioning material, wherein a first reinforcing wire is embedded into the cushioning material at a first side of the through-hole, and a second reinforcing wire is embedded into the cushioning material at a second side of the through hole opposite to the first side.

(4) In a fourth aspect, there is provided the vehicle seat according to the third aspect, wherein the first reinforcing wire and the second reinforcing wire are opposed to each other with the through-hole therebetween.

(5) In a fifth aspect, there is provided the vehicle seat according to the third aspect, wherein the first reinforcing wire and the second reinforcing wire are arranged parallel to the through-hole.

(6) In a sixth aspect, there is provided the vehicle seat according to the third aspect, wherein the second reinforcing wire is provided at an outer side with respect to the first reinforcing wire, and wherein the second reinforcing wire includes a bent portion that avoids the through-hole.

(7) In a seventh aspect, there is provided the vehicle seat according to the third aspect, wherein the first reinforcing wire and the second reinforcing wire are positioned at the same position in the thickness direction of the cushioning material.

What is claimed is:

1. A vehicle seat comprising:
a seat component having a central main portion and side portions provided at opposing outer sides of the central main portion, the seat component including:
a cushioning material constituting an outer shape of the vehicle seat;
a through-hole penetrating the cushioning material in a thickness direction thereof between the side portion and the outer side of the central main portion; and
a skin material configured to cover the cushioning material,
wherein a reinforcing wire is embedded into the cushioning material at both sides of the through-hole, respectively, along the side portion and the outer side of the central main portion.

2. The vehicle seat according to claim 1,
wherein the seat component includes a fixing wire which is provided in a groove portion of the cushioning material and a suspending wire which is provided to the skin material and configured to be arranged so as to be opposed to the fixing wire,
wherein a portion of the skin material is attached to the cushioning material in a suspending form by a connection between the fixing wire and the suspending wire, and
wherein the reinforcing wire is configured by at least a portion of the fixing wire.

3. A vehicle seat comprising:
a seat component having a central main portion and side portions provided opposing outer sides of the central main portion, the seat component including:
a cushioning material constituting an outer shape of the vehicle seat;
a through-hole penetrating the cushioning material in a thickness direction thereof between the side portion and the outer side of the central main portion; and
a skin material configured to cover the cushioning material,
wherein a first reinforcing wire is embedded into the cushioning material at a first side of the through-hole, and a second reinforcing wire is embedded into the cushioning material at a second side of the through hole opposite to the first side along the side portion and the outer side of the central main portion.

4. The vehicle seat according to claim 3, wherein the first reinforcing wire and the second reinforcing wire are opposed to each other with the through-hole therebetween.

5. The vehicle seat according to claim 3, wherein the first reinforcing wire and the second reinforcing wire are arranged parallel to the through-hole.

6. The vehicle seat according to claim 3, wherein the second reinforcing wire is provided at an outer side with respect to the first reinforcing wire, and wherein the second reinforcing wire includes a bent portion that avoids the through-hole.

7. The vehicle seat according to claim 3, wherein the first reinforcing wire and the second reinforcing wire are positioned at the same position in the thickness direction of the cushioning material.

\* \* \* \* \*